UNITED STATES PATENT OFFICE.

FRANK S. WASHBURN, OF NASHVILLE, TENNESSEE.

FERTILIZER AND PROCESS OF MAKING THE SAME.

1,100,638.  Specification of Letters Patent. Patented June 16, 1914.

No Drawing. Application filed November 5, 1913. Serial No. 799,386.

*To all whom it may concern:*

Be it known that I, FRANK S. WASHBURN, a citizen of the United States, residing at Nashville, in the county of Davidson and State of Tennessee, have invented certain new and useful Improvements in Fertilizers and Processes of Making the Same; and I do hereby declare the following to be a full, clear, and exact description of the invention, such as will enable others skilled in the art to which it appertains to make and use the same.

This invention relates to a new fertilizer and the process of making the same, and has for its object to provide a product and process which will avoid many of the objections now encountered in fertilizers heretofore proposed.

With these and other objects in view, the invention consists in the novel composition of matter and steps constituting my process of making the same, all as will be more fully hereinafter disclosed and particularly pointed out in the claims.

In order that my new fertilizer and process may be the more clearly understood, it is said:—The value of a highly concentrated ammonia-phosphoric acid compound for fertilizing purposes has long been appreciated by the commercial world, but innumerable obstacles have been encountered in the efforts to produce such a compound.

It is further well known that a number of processes have been proposed for the manufacture of ammonium phosphates, but so far as I am aware the properties of all of the products obtained have, in the majority of cases, been such that the said products could not be successfully used commercially in the fertilizer industry as at present conducted.

The phosphates of ammonia as ordinarily prepared are for the most part deliquescent. Further, owing to their high concentration they must be finely ground for the attainment of a uniform distribution throughout the fertilizer mixture. But, this deliquescence interferes with this grinding as well as with the subsequent storage and shipment of the material, and also with the uniform distribution in the fertilizer mixture. Further, certain of these phosphates of ammonia lose a portion of their ammonia in storage with a conversion of the phosphoric acid to an insoluble form in case the salt is not free from calcium compounds.

It is not practical, as is well known, to take the ordinary acid phosphate of commerce and add ammonia thereto in quantities greater than say five per cent. or six per cent. without causing a loss of ammonia and a conversion of the phosphoric acid to an insoluble form. The same is true of the double superphosphate made by treating phosphate rock with phosphoric acid.

As a result of the foregoing difficulties and objections, there is no commercially acceptable form of ammonium phosphate on the market today so far as I am aware. According to this invention on the other hand, it has been found that if ammonia is conducted into phosphoric acid containing a small amount of sulfuric acid, a homogeneous mixed crystal containing sulfuric acid equivalent to about ten per cent. of the phosphoric acid present will be formed. This product constitutes a real chemical compound which is further found to be a stable non-deliquescent salt containing a high concentration of both ammonia and phosphoric acid. The salt thus formed is in no sense a mechanical mixture of ammonium phosphate and ammonium sulfate, but is a salt homogeneous in composition and widely different in all properties from either ammonium phosphate or ammonium sulfate. I prefer to call it ammonium sulfate-phosphate, as it is undoubtedly a double phosphate and sulfate compound of ammonia. The range of mixed crystals thus produced seems to be quite wide, for good results appear with from a few per cent. of sulfuric acid up to a large per cent. thereof, although I prefer to employ mixed acids containing, say sufficient sulfuric acid to be equivalent to from five to ten per cent. of the phosphoric acid present. These salts may vary in their ammonia content from the monoammonium sulfate-phosphate, to the tri-ammonium sulfate-phosphate, and all the intermediate salts are found to have the same non-deliquescent and stable properties as those above noted.

In carrying out my process, I prefer to proceed as follows:— Phosphate rock consisting essentially of tri-calcium phosphate is treated with sulfuric acid in quantities such that the number of chemical equivalents of sulfuric acid added are in excess of the number of chemical equivalents of the phosphoric acid present in the rock. This excess may be from five to ten per cent. of the phosphoric acid equivalents. This treatment of the rock also assumes an addition of sulfuric acid in excess of the above requirement sufficient to decompose any impurities in the phosphate rock, such, for example, as the iron alumina and calcium carbonate present. With this latter excess of sulfuric acid, all these impurities will be acted on by the sulfuric acid and converted to sulfates in addition to the action of the sulfuric acid on the tri-calcium phosphate present. It will thus be seen that the addition of sulfuric acid to the phosphate rock, as above disclosed, will result in all the calcium carbonate, iron and alumina compounds being converted into sulfates while the tri-calcium phosphate will be converted into calcium sulfate and phosphoric acid, and there will be present an excess of free sulfuric acid in the mass. I next leach with water the decomposed rock, obtaining a solution of phosphoric acid and sulfuric acid, the latter preferably being from one-fiftieth to one-tenth of the phosphoric acid, though wider limits may be employed if desired. This solution will also contain small amounts of impurities, such as calcium, iron and aluminum sulfates, but these said impurities are not found to seriously interfere with the process. I next suitably separate this solution from its insoluble residue, as by filtration, decantation or other well known means, thus obtaining a clear liquor which is treated with ammonia gas. This gas neutralizes the mixed phosphoric and sulfuric acids to form the desired mixed crystals which with the excess of ammonia present, largely separate out as insoluble compounds. The ammonia sulfate-phosphate salt may also be obtained by evaporating the liquor in case it is not desirable to add the ammonia in sufficient quantity to form the tri-ammonium salt in the cold. This recovery of the double salt by precipitation or by evaporation and crystallization is always completely under the control of the operator depending on the concentration of the solutions and temperature of the same. A strong cooling of the solution is found advisable when the mono and di-ammonium salts are formed.

Important features of my process are the treatment of the phosphate rock carried out with an excess of sulfuric acid, so as to leave a portion thereof in the free state, followed by a separation of the soluble products from the insoluble products, and a treatment of the soluble products with ammonia to form the desired ammonium sulfate-phosphate of the mono di or tri form, but of course I do not desire to limit myself to the above described details of carrying out this chemical operation.

It is further very desirable to make the addition of acid such that all the combined phosphoric acid of the rock is set free, and not merely sufficient to convert the phosphates to a water soluble form, because the addition of ammonia to a mono-calcium phosphate in any considerable quantity causes a conversion of the water soluble mono-calcium phosphate to an insoluble tri-calcium phosphate at least in part.

A specific example of a proper addition of acid may be given as follows:— For each forty pounds of calcium as a carbonate and phosphate, add ninety-eight pounds of sulfuric acid. For each fifty-six pounds of soluble ferrous iron present, add ninety-eight pounds of sulfuric acid. For each fifty-six pounds of soluble ferric iron, add one hundred and forty-seven pounds of sulfuric acid. For each twenty-seven pounds of aluminum present, in a soluble form, add one hundred and forty seven pounds of sulfuric acid. Then add two to ten per cent. excess of sulfuric acid for the formation of the ammonium sulfate-phosphate mixed crystal compound.

As above intimated, it is obvious that those skilled in the art may vary the details of procedure as well as the composition of the product without departing from the spirit of my invention, and therefore I do not wish to be limited to the above disclosure except as may be required by the claims.

What I claim is:—

1. The process of producing a stable non-deliquescent fertilizer which consists in treating phosphate rock with sulfuric acid sufficient to convert the impurities and the calcium carbonates contained in said rock into sulfates and to liberate the phosphoric acid from the tri-calcium phosphate, and to still have present an excess of said acid; separating the soluble from the insoluble constituents in the form of a solution; and treating the soluble constituents of said solution with ammonia in excess to form an ammonium sulfate-phosphate crystalline compound, substantially as described.

2. The process of producing a double phosphate and sulfate crystalline compound of ammonia which consists in treating phosphate rock with an excess of sulfuric acid to leave a portion of said acid in the free state; separating the water soluble constituents of the mass thus produced from the insoluble constituents and treating said soluble constituents with ammonia in excess to form said double compound, substantially as described.

3. The herein described new fertilizer compound containing ammonia in the double form of a phosphate and sulfate, the said compound being crystalline, non-deliquescent and stable under normal conditions, substantially as described.

4. The herein described new fertilizer compound containing ammonia, phosphoric and sulfuric acids chemically combined and in the form of a crystal, which is stable under normal conditions, substantially as described.

In testimony whereof I affix my signature, in presence of two witnesses.

FRANK S. WASHBURN.

Witnesses:
C. M. GRANT,
W. D. KIRKPATRICK.